United States Patent
Nung

(10) Patent No.: US 8,035,722 B2
(45) Date of Patent: Oct. 11, 2011

(54) SYSTEM AND METHOD FOR CALCULATING DIMENSIONS OF OBJECT DURING IMAGE CAPTURE OF OBJECT FOR USE IN IMAGING DEVICE

(75) Inventor: Pei-Chen Nung, Taipei Hsien (TW)

(73) Assignee: Hon Hai Precision Industry Co., Ltd., Tu-Cheng, New Taipei (TW)

( * ) Notice: Subject to any disclaimer, the term of this patent is extended or adjusted under 35 U.S.C. 154(b) by 356 days.

(21) Appl. No.: 12/394,240

(22) Filed: Feb. 27, 2009

(65) Prior Publication Data

US 2010/0073500 A1  Mar. 25, 2010

(30) Foreign Application Priority Data

Sep. 19, 2008  (CN) .......................... 2008 1 0304576

(51) Int. Cl.
*G02B 13/16* (2006.01)
*H04N 5/225* (2006.01)

(52) U.S. Cl. ......... 348/335; 348/340; 348/345; 348/348

(58) Field of Classification Search ................. 348/335, 348/340, 345, 348; 250/208.1; 257/290–292
See application file for complete search history.

(56) References Cited

U.S. PATENT DOCUMENTS

2009/0039167 A1* 2/2009 Wang et al. .............. 235/462.42
2009/0074396 A1* 3/2009 Park et al. ..................... 396/128

FOREIGN PATENT DOCUMENTS

CN  101144958 A  3/2008
CN  101183206 A  5/2008

* cited by examiner

*Primary Examiner* — Yogesh Aggarwal
(74) *Attorney, Agent, or Firm* — Altis Law Group, Inc.

(57) ABSTRACT

A system for calculating the dimensions of an object during an image capture of the object in an imaging device includes an imaging module, a dimension calculating module, and an indication module. The imaging module is configured for capturing an image of an object. The dimension calculating module is configured for calculating the dimensions of the object. The indication module is configured for indicating the dimensions of the object in the captured image.

9 Claims, 4 Drawing Sheets

SYSTEM AND METHOD FOR CALCULATING DIMENSIONS OF OBJECT DURING IMAGE CAPTURE OF OBJECT FOR USE IN IMAGING DEVICE

BACKGROUND

1. Technical Field

Embodiments of the present disclosure relate to imaging devices and, particularly, to a system and a method for automatically calculating dimensions of an object during an image capture of the object in an imaging device.

2. Description of the Related Art

One of the applications of image capturing devices such as digital cameras is for capturing images of goods to post the images in an online store for online shoppers to browse. However, majority of those images contain no dimensions of goods, therefore, it is difficult for a shopper to estimate the dimensions of the goods merely by looking at pictures.

Accordingly, it is desirable to provide a system and method for automatically calculating dimensions of an object during an image capture of the object in an imaging device, which can overcome the above-mentioned problem.

DETAILED DESCRIPTION OF THE EMBODIMENTS

Embodiments of the disclosure will now be described in detail with reference to the accompanying drawings.

Figure 1:
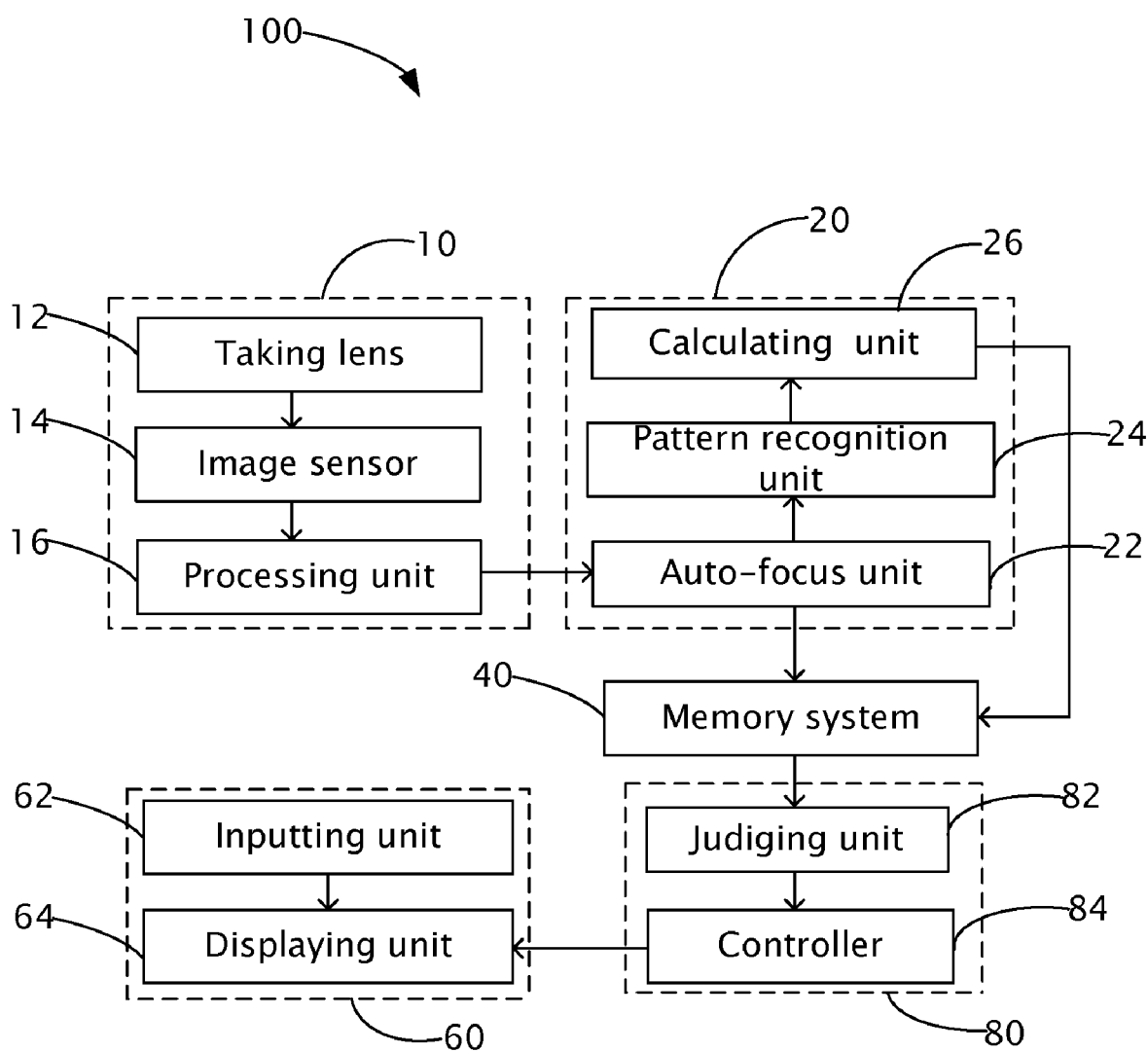
FIG. 1 is a block diagram of an exemplary embodiment of a system for calculating the dimensions of an object during an image capture of the object in an imaging device including a user interface, according to one embodiment.
Figure 2:
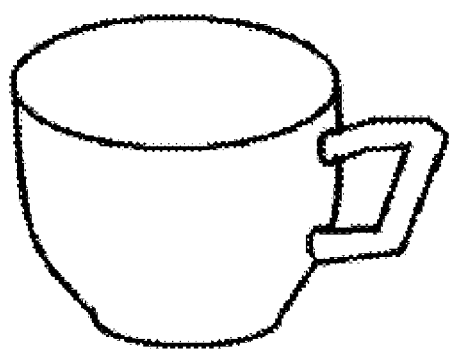
FIG. 2 shows an image of the object shown in the user interface of the system of FIG. 1.
Figure 3:
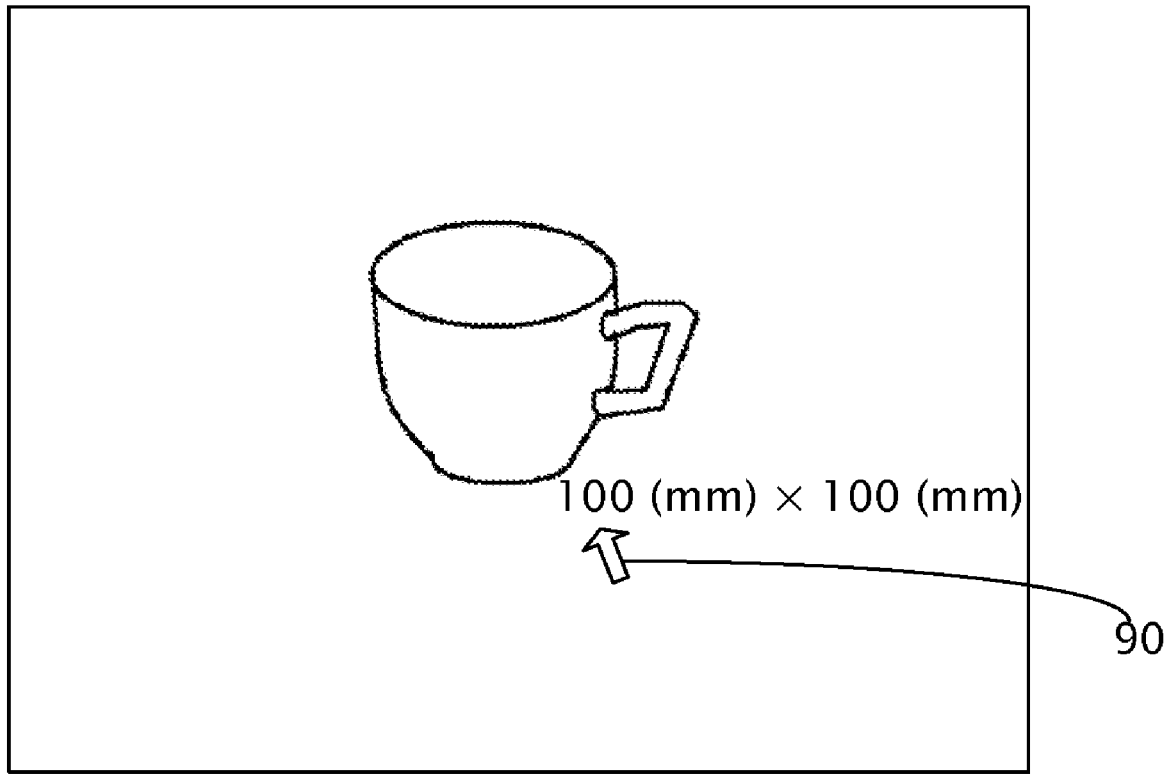
FIG. 3 shows the dimensions of the object displayed on the image of FIG. 2.

Referring to FIGS. 1-3, a system 100 according to one embodiment is configured for calculating the dimensions of an object during an image capture of the object in an imaging device. The system 100 includes an imaging module 10, a dimension calculating module 20, a memory system 40, a user interface 60, and an indication module 80.

The imaging module 10 is configured for capturing an image of an object. In the embodiment, the imaging module 10 captures an image of a cup as an exemplary object. The imaging module 10 includes a taking lens 12, an image sensor 14, and a processing unit 16.

The taking lens 12 may include many lenses which maybe grouped into several lens groups. The taking lens 10 can be zoom or fixed-focal type.

The image sensor 14 is configured for converting light transmitted through the taking lens 12 to electrical signals. The image sensor 14 is typically a charge-coupled device (CCD) or a complementary metal oxide semiconductor (CMOS) device. The image sensor 14 can be a semiconductor package selected from the group consisting of a ceramic leaded chip carrier (CLCC) package type image sensor, a plastic leaded chip carrier (PLCC) package type image sensor, and a chip scale package (CSP) type image sensor.

The processing unit 16 converts the converted electrical signals from the image sensor 14 into a digital image of the object.

The dimension calculating module 20 is configured for calculating the dimensions of the object. The dimension calculating module 20 includes an auto-focus unit 22, a pattern recognition unit 24, and a calculating unit 26.

The auto-focus unit 22 is configured for receiving the image from the processing unit 16, performing passive analysis of the digital image and thereby determining a correct focus for the object. Once the correct focus is determined, the auto-focus unit 22 also can determine the distance from the image sensor 14 to the taking lens 12 and the distance from the object to the taking lens 12. These distances are stored in the memory system 40.

The pattern recognition unit 24 is configured for recognizing the object in the image after the digital image is in focus and determining dimensions of the area occupied by the object within the image. Data such as the dimensions of the occupied area and the position of the object are stored in the memory system 40. In the embodiment, the dimensions of the occupied area are the height and width of the occupied area. The pattern recognition unit 24 can use many available methods, such as edge detection, to recognize the object in the image and determine the dimensions of occupied area. In the embodiment, the approximate height and width of the occupied area is 10 (mm)×10 (mm).

The calculating unit 26 is configured for calculating approximate dimensions of the object according to ratios determined by the relationships between the distance from the object to the taking lens 12, the distance from the image sensor 14 to the taking lens 12, and the dimensions of the occupied area in the digital image. In the embodiment, the dimensions of the object are height and width of the object. The dimension data, which is stored in the memory system 40, can be configured to appear in the image along with the object whenever the image is viewed. In the illustrated embodiment, the approximate height and width of the cup is 100 (mm)×100 (mm).

The user interface 60 includes an inputting unit 62 and a displaying unit 64. The inputting unit 62 is configured for inputting a command to capture an image of the object and select the object in the digital image. The displaying unit 64 is configured for displaying the image. The displaying unit 64 can be a touch screen. Thus, users can select the object to read the dimensions of the object via the touch screen intuitively.

The indication module 80 is configured for indicating the dimensions of the object in the image. The indication module 80 includes a judging unit 82 and a controller 84. The judging unit 82 is configured for obtaining the position of a selection cursor 90 of the user interface 60 and judging whether the selection cursor 90 is located within the occupied area. The controller 84 is configured for controlling the displaying unit 64 to display the dimensions in the image when the selection cursor 90 is located within the occupied area. Referring to FIG. 3, the height and width of the cup is displayed adjacent the cup.

The dimension data associated with the image may be written in the Exchangeable Image File (EXIF) of the image so that when the image is downloaded, transferred, transmitted, printed etc., the dimensions will be part of the image.

Furthermore, the memory system 40 also can function as the system memory of the imaging device. The controller 84 can be the central controller of the imaging device.

Figure 4:
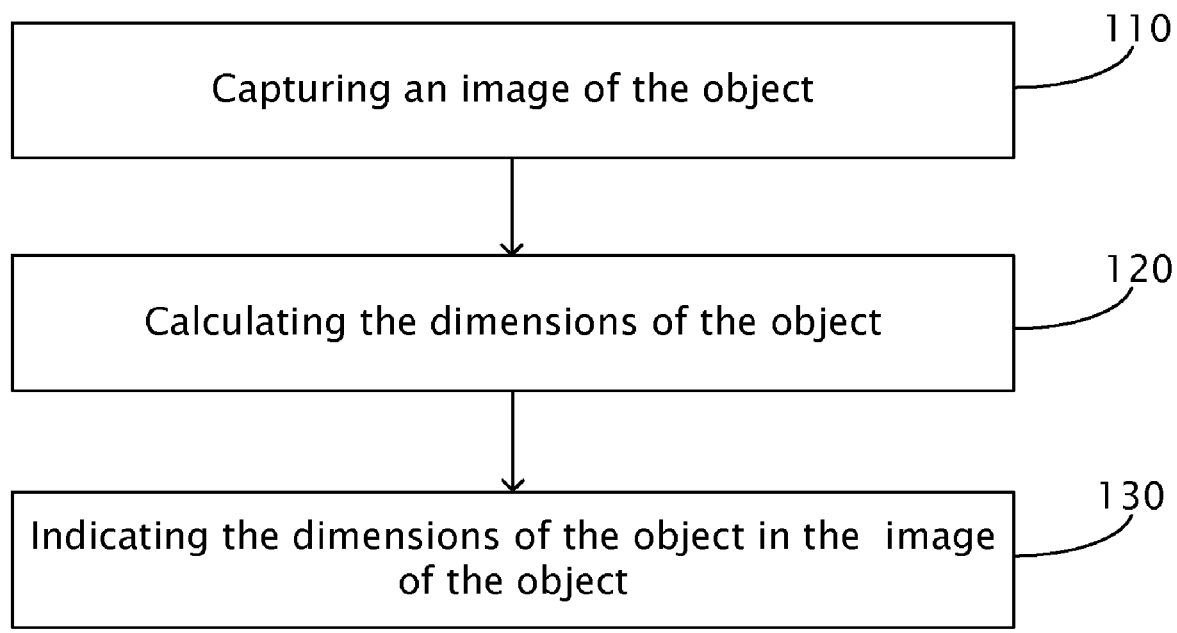
FIG. 4 is a flowchart of an exemplary embodiment of a method for calculating the dimensions of an object during an image capture of the object in an imaging device.

Referring to FIG. 4, a flowchart of a method for calculating the dimensions of an object during an image capture of the object in an imaging device is shown.

In step 110, the image sensor 14 converts light transmitted through the taking lens 12 to electrical signals, the processing unit 16 converts the converted electrical signals from the image sensor 14 into a digital image of the object. For example, a CCD converts light transmitted through the taking lens 12 to electrical signal.

In step 120, the auto-focus unit 22 receives the digital image from the processing unit 16, performing passive analysis of the digital image and thereby determining a correct focus for the object. Once the correct focus is determined, the distance from the image sensor 14 to the taking lens 12 and the distance from the object to the taking lens 12 can be determined by the auto-focus unit 22 and stored in the memory system 40. The pattern recognition unit 24 recognizes the object in the image after the digital image is in focus and determines dimensions of the area occupied by the object within the image. Data of the dimensions of the occupied area are stored in the memory system 40. In the embodiment, the dimensions of the occupied area are height and width of the occupied area. The calculating unit 26 calculates approximate dimensions of the object according to ratios determined by the relationships between the distance from the object to the taking lens 12, the distance from the image sensor 14 to the taking lens 12, and the dimensions of the occupied area in the digital image. In the embodiment, the dimensions of the object are height and width of the object.

In step 130, the judging unit 82 obtains the position of a selection cursor 90 of the user interface 80 and judges whether the selection cursor 90 is located within the occupied area. The controller 84 controls the displaying unit 64 to display the dimensions of the object in the image when the selection cursor 90 is located within the occupied area. The selection cursor 90 can be moved by user input, for example, the user controls the guiding key of the inputting unit 62 to move the selection cursor 90 for selecting the object.

The system and method for calculating the dimensions of the object during an image capture of the object in the imaging device can automatically calculate and display the dimensions of the object in the image, thereby it is convenient for a potential customer to view the dimensions of the object in the image wherever it may be viewed.

It is to be understood, however, that even though numerous characteristics and advantages of the embodiments have been set forth in the foregoing description, together with details of the structures and functions of the embodiments, the disclosure is illustrative only, and changes may be made in details, especially in matters of arrangement of parts within the principles of the invention to the full extent indicated by the broad general meaning of the terms in which the appended claims are expressed.

What is claimed is:

1. A system for calculating the dimensions of an object during an image capture of the object for use in an imaging device comprising:
   an imaging module configured for capturing an image of the object, and comprising a taking lens and an image sensor;
   a memory system;
   a dimension calculating module configured for calculating the dimensions of the object, and comprising:
      an auto-focus unit configured for receiving the digital image from the imaging module and determining a correct focus for the object, the distance from the image sensor to the taking lens and the distance from the object to the taking lens being determined by the auto-focus unit and stored in the memory system;
      a pattern recognition unit configured for recognizing the object in the image and determining dimensions of the area occupied by the object within the image, the dimension data of the occupied area being stored in the memory system; and
      a calculating unit configured for calculating approximate dimensions of the object according to ratios determined by the relationships between the distance from the object to the taking lens, the distance from the image sensor to the taking lens, and the dimensions of the occupied area in the digital image, the dimension data of the object being stored in the memory system;
   an indication module configured for indicating the dimensions of the object in the image of the object.

2. The system of claim 1, wherein the imaging module further comprises a processing unit, the image sensor is configured for converting light transmitted through the taking lens to electrical signal, the processing unit is configured for converting the converted electrical signals from the image sensor into a digital image of the object.

3. The system of claim 1, wherein the dimensions of the occupied area are height and width of the occupied area.

4. The system of claim 1, wherein the dimensions of the object are height and width of the object.

5. The system of claim 1, further comprising a user interface, wherein the user interface comprises a displaying unit, the indication module comprises a judging unit and a controller, the judging unit is configured for obtaining the position of a selection cursor of the imaging device and judging whether the selection cursor is located within the occupied area, the controller is configured for controlling the displaying unit to display the dimensions of the object in the image when the selection cursor is located within the occupied area.

6. A method for calculating the dimensions of an object during an image capture of the object for use in an imaging module comprising a taking lens and an image sensor, the method comprising:
   capturing an image of the object;
   calculating the dimensions of the object, comprising:
      receiving the digital image from the imaging module and determining a correct focus for the object, determining the distance from the image sensor to the taking lens and the distance from the object to the taking lens;
      recognizing the object in the image and determining dimensions of the area occupied by the object within the image; and
      calculating approximate dimensions of the object according to ratios determined by the relationships between the distance from the object to the taking lens, the distance from the image sensor to the taking lens, and the dimensions of the occupied area in the digital image, the dimension data of the object;
   indicating the dimensions of the object in the image.

7. The method of claim 6, wherein the dimensions of the occupied area are height and width of the occupied area.

8. The method of claim 6, wherein the dimensions of the object are height and width of the object.

9. The method of claim 6, wherein the step of indicating comprises obtaining the position of a selection cursor of the imaging device and judging whether the selection cursor is located within the occupied area, and displaying the dimensions of the object in the digital image when the selection cursor is located within the occupied area.

* * * * *